No. 719,446. PATENTED FEB. 3, 1903.
F. L. DYER.
APPARATUS FOR WEIGHING COTTON, &c., IN BULK.
APPLICATION FILED OCT. 31, 1899.
NO MODEL. 3 SHEETS—SHEET 1.

Witnesses. Inventor

No. 719,446. PATENTED FEB. 3, 1903.
F. L. DYER.
APPARATUS FOR WEIGHING COTTON, &c., IN BULK.
APPLICATION FILED OCT. 31, 1899.
NO MODEL. 3 SHEETS—SHEET 2.
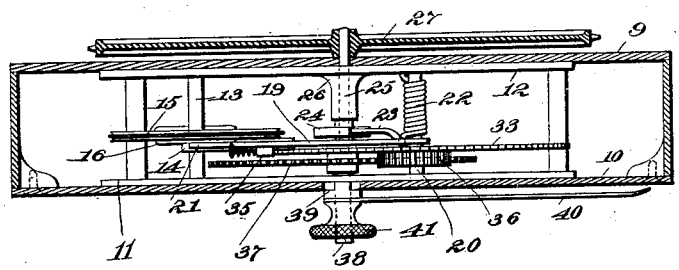
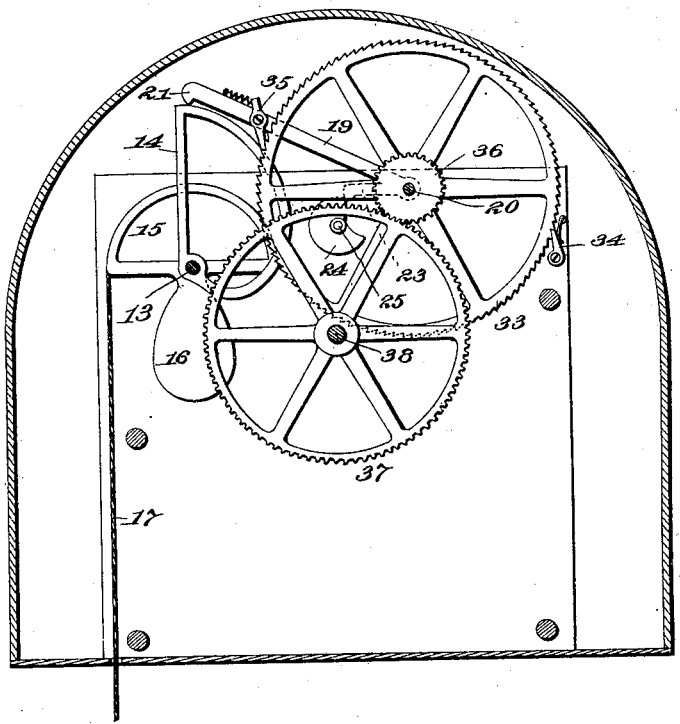
Witnesses.
Inventor
Frank L. Dyer

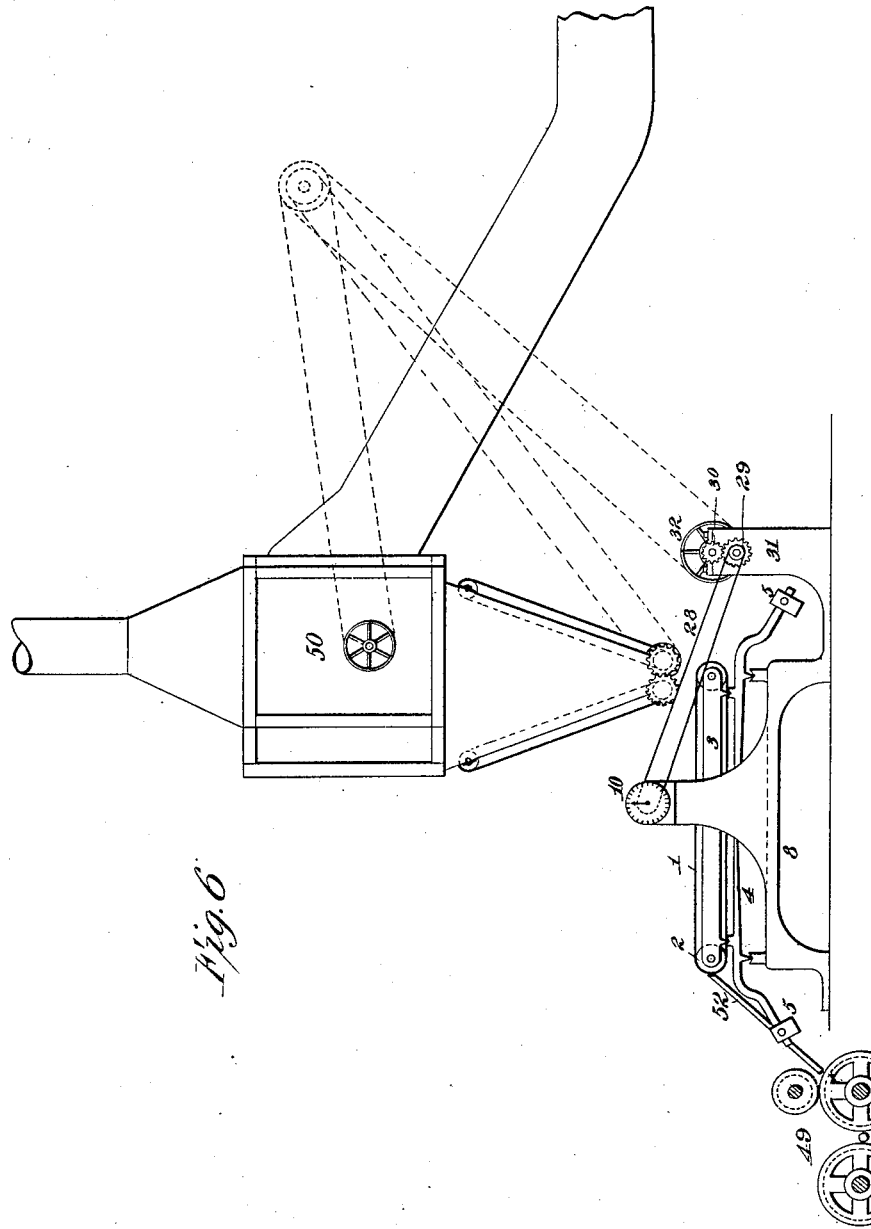

UNITED STATES PATENT OFFICE.

FRANK L. DYER, OF MONTCLAIR, NEW JERSEY, ASSIGNOR, BY MESNE ASSIGNMENTS, TO CENTRAL TRUST COMPANY OF NEW YORK, TRUSTEE, A CORPORATION OF NEW YORK.

APPARATUS FOR WEIGHING COTTON, &c., IN BULK.

SPECIFICATION forming part of Letters Patent No. 719,446, dated February 3, 1903.

Application filed October 31, 1899. Serial No. 735,357. (No model.)

*To all whom it may concern:*

Be it known that I, FRANK L. DYER, a citizen of the United States, residing at Montclair, in the county of Essex and State of New Jersey, have invented a certain new and useful Improvement in Apparatus for Weighing Cotton and other Moving Material in Bulk, (Case No. 36,) of which the following is a description.

My invention relates to an improved apparatus for weighing cotton and other moving material in bulk; and the invention is particularly designed for weighing a cotton-bat in course of movement between a bat-former and a press for forming the bat into a bale.

At the present time the amount of cotton formed into bales in process of manufacture is entirely a matter of guess; but with my present improvement the cotton before its formation into a bale and without interrupting its passage toward the press may be weighed with accuracy, so that the process of baling may be stopped at any time when a desired amount of cotton has been accumulated.

My invention is of course applicable to the weighing of other material in bulk—such, for instance, as coal traveling from a feed-bin to a boiler.

In order that my invention may be better understood, attention is directed to the accompanying drawings, showing the preferred construction, and wherein—

Figure 1:
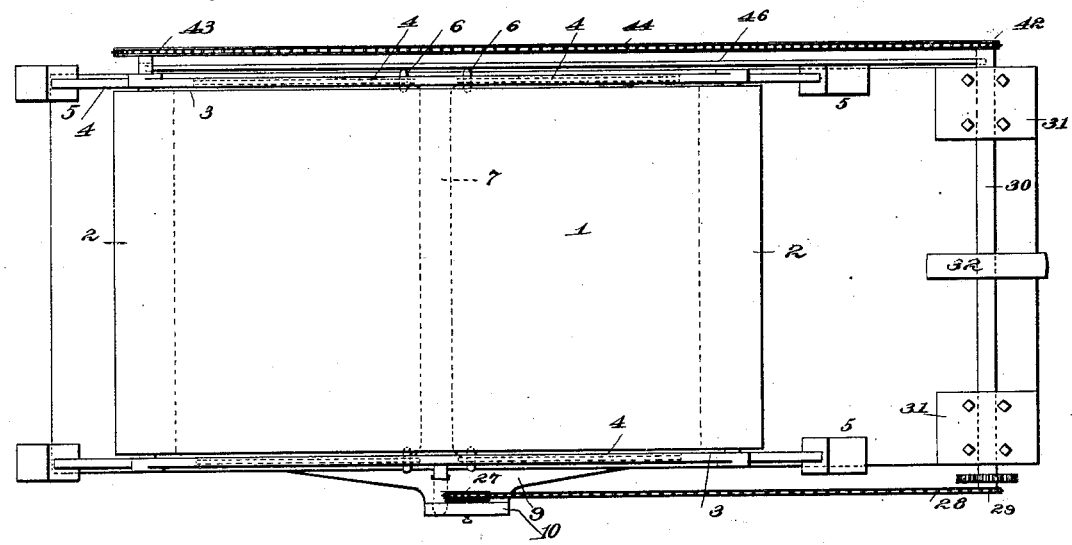
Figure 2:
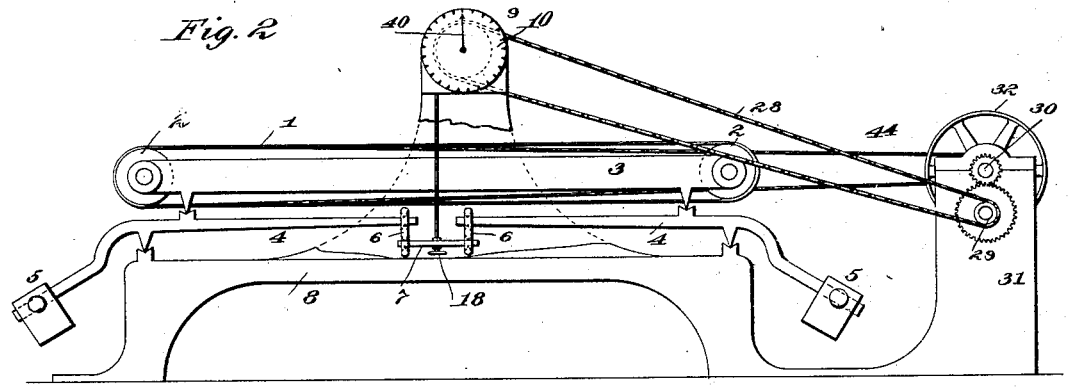
Figure 3:
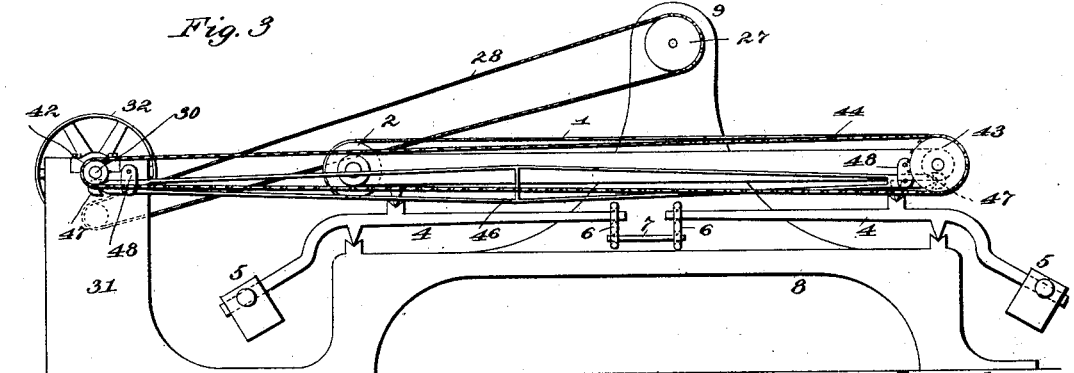

Figure 1 is a plan view; Fig. 2, a side elevation; Fig. 3, an elevation from the other side; Fig. 4, a sectional view through the register; Fig. 5, an interior view of the register with the front face removed, and Fig. 6 an elevation showing the location of the device when employed in connection with a cotton-press.

In all of the above views corresponding parts are represented by the same numerals of reference.

An endless belt 1 is mounted upon rollers 2, having bearings in a suitable frame 3. The frame 3 is supported on knife-edges by four scale-beams 4, two at each side. 5 represents the usual weights, adjustably carried by said scale-beams. Each scale-beam carries at its inner end a knife-edged link 6, all of the links supporting a cross-piece 7, whereby all of the scale-beams will move in unison. The scale-beams 4 are mounted on knife-edges on a base 8 of any suitable construction. Extending up from said base is a standard 9, which carries a light casing 10 of a suitable register. Mounted in the casing 10 are the front and back plates 11 and 12 of the register mechanism. 13 is a shaft mounted between said plates and carrying a cam 14 in the form of an involute curve.

15 is a segment carried by the shaft 13, and 16 is an overbalance-weight for holding the cam 14 normally in the position shown in Fig. 5. A light wire or chain 17 is secured to the periphery of the segment 15 and connects with the cross-piece 7, its tension being adjusted by an adjusting-nut 18, as shown in Fig. 2. An arm 19, carried on a shaft 20, is provided with a toothed head 21, which coöperates with the periphery of the cam 14. A spring 22 (see Fig. 4) moves the arm 19 toward the cam. The arm 19 is provided with a finger 23, which coöperates with the cam 24 and by which the arm 19 will be moved against the tension of the spring 22. The cam 24 is mounted on a shaft 25, supported in a boss 26 from the back plate 12. The shaft 25 is driven in any suitable way, preferably by means of a sprocket-wheel 27, with which a sprocket-chain 28 engages. The sprocket-chain 28 is driven by a sprocket-wheel 29 through intermediate gears from a shaft 30, mounted in bearings in supports 31. Power is applied to a pulley 32, keyed to the shaft 30.

Mounted loosely on the shaft 20 is a ratchet-wheel 33, having very fine teeth and with which a pawl 34 engages to prevent return movement of said wheel. The arm 19 carries a pawl 35 for feeding the wheel 33 forward. A gear 36 is carried with the ratchet-wheel 33 and meshes with a gear 37 on a shaft 38. The said shaft is provided with a boss 39, and an index 40 is frictionally engaged with said boss, so as to turn with the shaft 38, by means of a thumb-screw 41.

In order to drive the belt 1, I mount a sprocket-wheel 42 on the shaft 30 and drive therefrom a sprocket-wheel 43 on the shaft of one of the rollers 2 by means of a sprocket-chain 44. A stay 46, having reduced ends which engage the blocks 47 on the framework 3 and one of the standards 31, respectively, as shown in Fig. 3, opposes the tension of the sprocket-chain 44 and keeps the parts in their proper engagement. This stay 46 is supported by links 48, as shown.

Referring to Fig. 6, I show the arrangement of my improved weighing device when employed with a cotton-baling apparatus. 49 represents a cylindrical baling-press of the well-known type adapted to form a continuous sheet or bat of cotton into a cylindrical bale, and 50 represents a condenser or other bat-forming device for forming such a bat from the cotton as it is blown from the gins. The type of press illustrated in the drawings is that shown in my Patent No. 601,806, dated April 5, 1898; but other baling-presses for the purpose may be used. The type of bat-former illustrated in the drawings is that shown in patent to Magnus Swenson, No. 621,951, dated March 28, 1899; but other types of bat-formers may be employed. From the lower end of the bat-former the sheet or bat is deposited upon the belt 1, while a stationary chute 52 conducts the sheet or bat from the belt 1 into the press 49.

The operation of the device will be as follows: It being understood that the gearing is so proportioned that when the belt 1 has moved to an extent equal to the distance between the diametric centers of the rollers 2 2, the cam 24 will have elevated the arm 19 and will have allowed the said arm to drop with the head 21 in engagement with the cam 14. In other words, the proportions of the gearing are such that a movement of the arm 19 takes place the moment when the bulk of material last weighed has passed off of the belt 1 and an entirely new bulk of the material is in position on the belt. The shaft 30 being operated by power drives the shaft 25 of the register and the belt 1 through the sprocket-chain 44. The material will therefore be fed forward upon the belt and will be weighed by depressing the scale-beams 4 to the desired extent. This movement will actuate the cam 14, which will be moved to a proportionate extent, so that at each movement of the arm 19 toward the cam a feed movement of the ratchet-wheel 33 will take place, and such movement will be proportionate to the weight of the material on the belt. Thus it will be seen that if the belt is six feet in length between the vertical centers of the rollers 2 2 and is one yard in width a sheet or bat of cotton of that width will be weighed in lots of two square yards, and the weight of each lot will be indicated by the movement of the arm 19 toward the cam 14. These movements of the arm 19, indicating the weight of each lot of cotton passing continuously over the belt 1, will be added together and will be indicated by the index 40. When a sufficient amount of material has been fed over the belt 1, the operation may be stopped and the index 40 moved back to zero by loosening the thumb-nut 41, after which the operations above described may be repeated.

Having now described my invention, what I claim as new, and desire to secure by Letters Patent, is as follows:

1. An improved apparatus for weighing material in bulk, comprising in combination an endless belt, to which the material is continuously fed, means for weighing the entire bulk of material sustained by the belt and means for indicating the weights of successive bulks of material in transit upon said belt, each bulk corresponding to the entire material sustained by the belt at any time, substantially as and for the purposes set forth.

2. An improved apparatus for weighing material in bulk, comprising in combination an endless belt, to which the material is continuously fed, means for weighing the entire bulk of material sustained by the belt and means for indicating and totalizing the weights of successive bulks of material in transit upon said belt, each bulk corresponding to the entire material sustained by the belt at any time, substantially as and for the purposes set forth.

3. In an improved apparatus for weighing material in bulk, the combination of an endless belt to which the material is fed, means for weighing the material on said belt, a cam the position of which is determined by the weight of material on the belt, an arm coöperating with said cam, a register mechanism operated by said arm, and means for simultaneously moving said arm and said belt, substantially as set forth.

4. In an improved apparatus for weighing material in bulk, the combination of an endless belt to which the material is fed, means for weighing the material on said belt, a cam the position of which is determined by the weight of material on the belt, an oscillating arm which coöperates with said cam, a ratchet-wheel operated by said arm, an index operated by said ratchet-wheel, and means for simultaneously operating said arm and said belt, substantially as set forth.

5. In an improved apparatus for weighing material in bulk, the combination of an endless belt to which the material is continuously fed, a pair of scale-beams at each side and by which said belt is supported, a connecting-link between the free ends of said scale-beams, and means for registering the amount of material carried by said belt, substantially as set forth.

6. In an improved apparatus for weighing material in bulk, the combination of an endless horizontally-supported belt to which the material is fed, scale-beams for supporting said belt, means for indicating the amount of material on the belt, a driving-shaft mounted in stationary bearings, connections between said driving-shaft and the belt, and a stay sustained between a stationary abutment and the support for the belt, substantially as set forth.

7. In an improved apparatus for weighing material in bulk, the combination of an endless belt to which the material is fed, scale-beams for supporting said belt, means for indicating the amount of material on the belt, a driving-shaft mounted in stationary bearings, connections between said driving-shaft and the belt, a stay sustained between a stationary abutment and the support for the belt, and links supporting said stay, substantially as set forth.

8. The combination with a press for forming cotton-bales from a continuous sheet or bat, of means for forming a continuous sheet or bat, and a weighing and feeding apparatus interposed between the bat-forming mechanism and said press for weighing the sheet or bat and for moving the sheet or bat continuously in transit between the two, substantially as set forth.

This specification signed and witnessed this 27th day of October, 1899.

FRANK L. DYER.

Witnesses:
 JNO. R. TAYLOR,
 ISABEL MCINTOSH.